United States Patent
Kimura

(10) Patent No.: US 9,843,945 B2
(45) Date of Patent: Dec. 12, 2017

(54) COMMUNICATION APPARATUS

(71) Applicant: FUJITSU LIMITED, Kawasaki-shi, Kanagawa (JP)

(72) Inventor: Tadashi Kimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 95 days.

(21) Appl. No.: 14/936,350

(22) Filed: Nov. 9, 2015

(65) Prior Publication Data

US 2016/0174084 A1 Jun. 16, 2016

(30) Foreign Application Priority Data

Dec. 16, 2014 (JP) ................. 2014-254057

(51) Int. Cl.
| | | |
|---|---|---|
| *H04B 7/00* | (2006.01) | |
| *H04W 24/04* | (2009.01) | |
| *H04L 12/10* | (2006.01) | |
| *H04L 12/12* | (2006.01) | |
| *H04L 12/24* | (2006.01) | |
| *H04W 88/08* | (2009.01) | |

(52) U.S. Cl.
CPC ............ *H04W 24/04* (2013.01); *H04L 12/10* (2013.01); *H04L 12/12* (2013.01); *H04L 41/0833* (2013.01); *H04W 88/08* (2013.01); *Y02B 60/34* (2013.01)

(58) Field of Classification Search
CPC ............ H04B 2203/5445; H04B 3/54; H04B 5/0018; H04B 3/50; H04M 1/733
USPC ............ 455/402, 403, 14, 523, 522, 68, 69
See application file for complete search history.

(56) References Cited

U.S. PATENT DOCUMENTS

| | | | | |
|---|---|---|---|---|
| 8,077,032 B1* | 12/2011 | Vier | ................. | G08B 13/2491 340/3.1 |
| 8,081,589 B1* | 12/2011 | Gilbrech | ................. | G06F 1/266 370/310 |
| 2006/0112288 A1* | 5/2006 | Schindler | ................. | G06F 1/266 713/300 |
| 2006/0168459 A1* | 7/2006 | Dwelley | ................. | H04L 12/10 713/300 |
| 2006/0185877 A1* | 8/2006 | Soffer | ................. | H02G 3/123 174/50 |
| 2007/0081504 A1* | 4/2007 | Shih | ................. | G06F 1/3203 370/338 |
| 2007/0170909 A1* | 7/2007 | Vorenkamp | ................. | G06F 1/266 324/76.11 |
| 2007/0184863 A1* | 8/2007 | Takagi | ................. | H04W 52/346 455/507 |

(Continued)

FOREIGN PATENT DOCUMENTS

| | | |
|---|---|---|
| JP | 2010-063000 A | 3/2010 |
| JP | 2012-518820 A | 8/2012 |

*Primary Examiner* — Dominic Rego
(74) *Attorney, Agent, or Firm* — Arent Fox LLP

(57) ABSTRACT

A communication apparatus is configured to work by power supplied through a communication line, the communication apparatus includes: a controller, when the controller detects that the power supplied through the communication line decreases in a predetermined range, configured to degrade operation of the communication apparatus, the degraded operation including at least one of stop of partial function among functions held by the communication apparatus and a decrease in performance of the functions held by the communication apparatus.

17 Claims, 11 Drawing Sheets

(56) References Cited

U.S. PATENT DOCUMENTS

| | | | |
|---|---|---|---|
| 2008/0016263 A1* | 1/2008 | Diab | G06F 13/4072 710/105 |
| 2008/0315682 A1* | 12/2008 | Hussain | H04L 12/10 307/2 |
| 2009/0225701 A1* | 9/2009 | Kwon | H04L 1/0006 370/328 |
| 2010/0091770 A1* | 4/2010 | Ishikawa | H04L 47/20 370/389 |
| 2010/0122108 A1* | 5/2010 | Suzuki | G06F 1/3203 713/600 |
| 2010/0141442 A1* | 6/2010 | Matsuyama | H04L 12/2825 340/541 |
| 2011/0022862 A1* | 1/2011 | Nagao | G06F 1/266 713/310 |
| 2011/0125510 A1* | 5/2011 | Ho | H04W 48/02 705/1.1 |
| 2011/0293027 A1* | 12/2011 | Rezvani | H04B 7/0413 375/260 |
| 2011/0298428 A1 | 12/2011 | Liu | |
| 2012/0033744 A1* | 2/2012 | Ovchinnikov | H04B 3/548 375/257 |
| 2012/0113879 A1* | 5/2012 | Aoki | H04L 1/1614 370/311 |
| 2013/0005345 A1* | 1/2013 | Yoshihara | H04W 52/0206 455/443 |
| 2013/0049469 A1* | 2/2013 | Huff | G06F 1/266 307/62 |
| 2013/0121182 A1* | 5/2013 | Hegge | H04W 36/14 370/252 |
| 2013/0148972 A1* | 6/2013 | Kazawa | H04B 10/27 398/100 |
| 2013/0196709 A1* | 8/2013 | Nho | G06F 1/324 455/550.1 |
| 2013/0201930 A1* | 8/2013 | Okino | H04W 72/1289 370/329 |
| 2013/0260762 A1* | 10/2013 | Tomita | H04W 36/30 455/436 |
| 2013/0334872 A1* | 12/2013 | Kodama | H02J 3/385 307/1 |
| 2015/0237578 A1* | 8/2015 | Gogate | H04W 52/0235 370/311 |

* cited by examiner

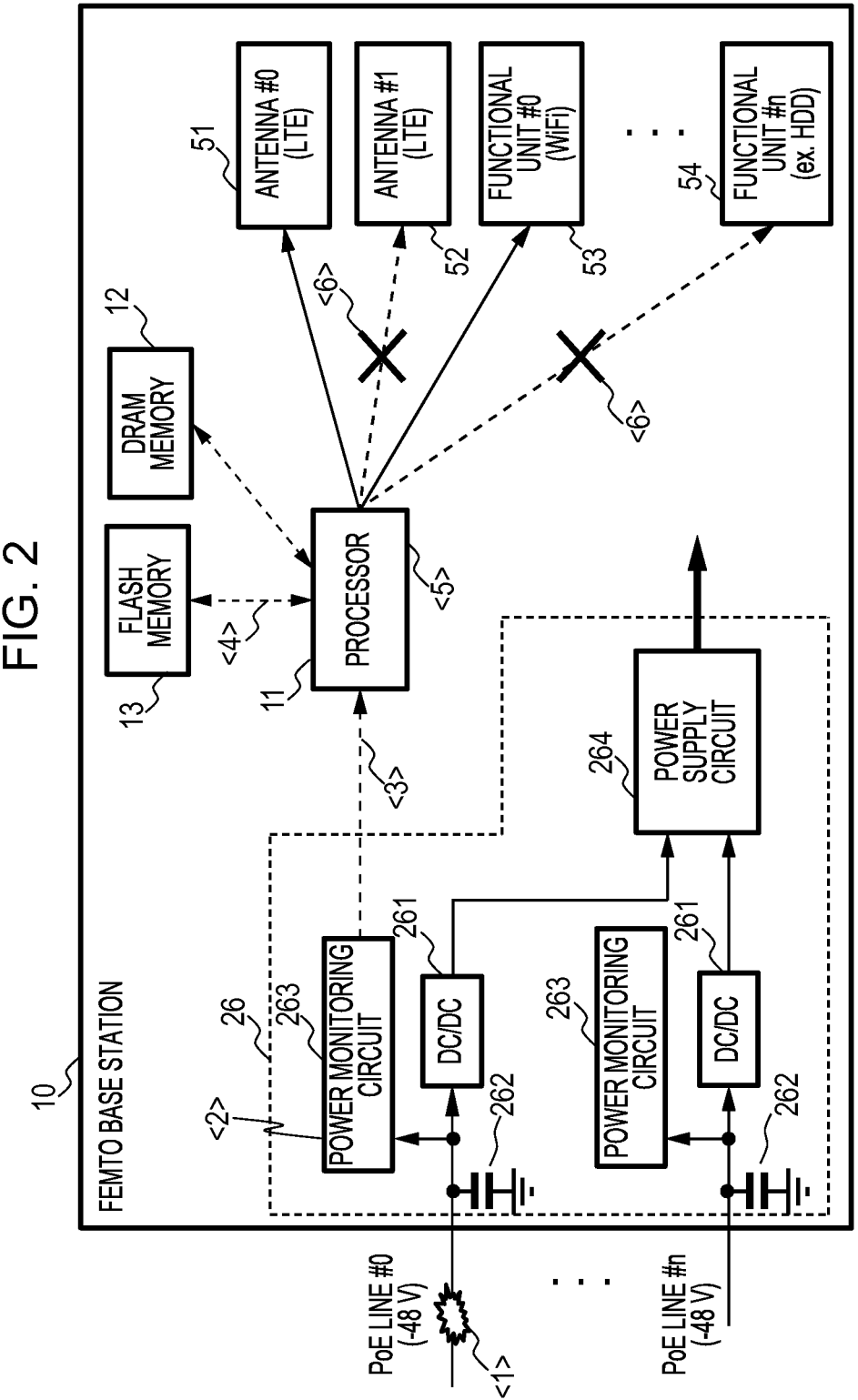

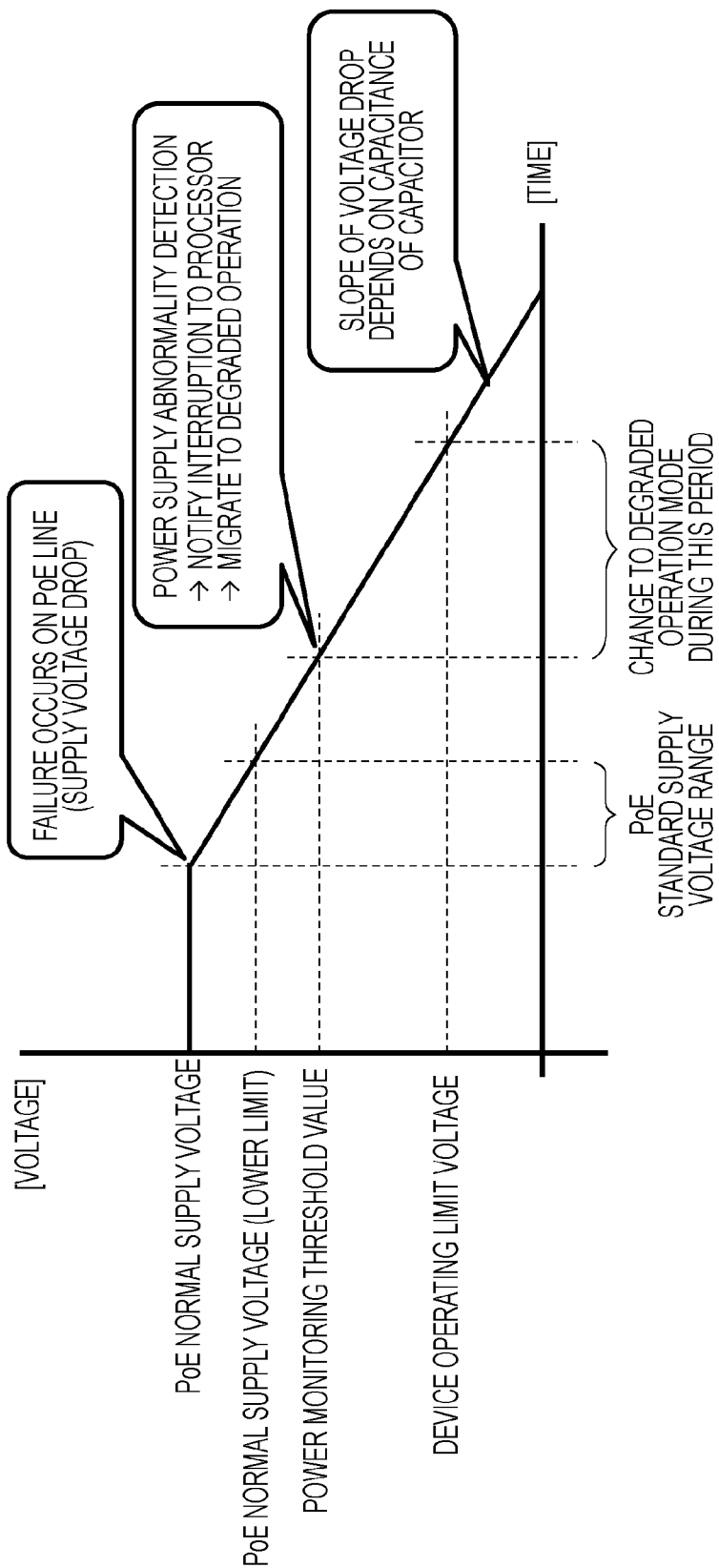

FIG. 4

<CALCULATION EXPRESSION OF CAPACITOR CAPACITANCE>

$$Cin = \frac{2 \times Win \times t}{(Vin - Vout)^2}$$

<EXAMPLE OF VARIOUS PARAMETERS> ... EACH PARAMETER DEPENDS ON CIRCUIT CONFIGURATION

| | PARAMETER | CALCULATED VALUE | |
|---|---|---|---|
| Win | DEVICE POER CONSUMPTION (BEFORE DEGRADED OPERATION) | 15 | W |
| t | MIGRATION TIME PERIOD TO DEGRADED OPERATION | 0.001 | s |
| Vin | POWER SUPPLY MONITORING THRESHOLD VALUE | 35 | V |
| Vout | DEVICE OPERATING LIMIT VOLTAGE | 15 | V |
| A | $(Vin - Vout)^2 =$ | 400 | — |
| B | $2 \times Win \times t =$ | 0.03 | — |
| Cin | REQUISITE CAPACITANCE OF MOMENTARY DISCONNECTION PROTECTION CAPACITOR | 75 | uF |

FIG. 5

| NO. | PoE LINE #0 | PoE LINE #1 | PoE LINE #2 | RECEIVING POSSIBLE POWER | REMARKS (EXPLANATION) |
|---|---|---|---|---|---|
| 1 | CLASS4 (25.5 W) | CLASS4 (25.5 W) | CLASS4 (25.5 W) | 76.5 W | COMBINATION OF MAXIMUM POWER CLASSES (CLASS4) OF ALL THE LINES STANDARDIZED AT THIS POINT IN TIME |
| 2 | CLASS4 (25.5 W) | CLASS4 (25.5 W) | CLASS0 (13 W) | 64 W | CASE WHERE ONLY ONE LINE INCLUDES CLASS0 (13 W) IN THE COMBINATION OF NO. 1 |
| 3 | CLASS4 (25.5 W) | FAILURE | CLASS4 (25.5 W) | 51 W | CASE WHERE A FAILURE OCCURS ON ONE LINE OF CLASS4 IN THE COMBINATION OF NO. 1 |
| 4 | CLASS4 (25.5 W) | FAILURE | CLASS0 (13 W) | 38.5 W | CASE WHERE ONE NORMAL LINE IS CLASS0 (13 W) IN THE COMBINATION OF NO. 3 |
| 5 | CLASS0 (13 W) | FAILURE | CLASS0 (13 W) | 26 W | CASE WHERE ALL THE NORMAL LINES ARE CLASS0 (13 W) IN THE COMBINATION OF NO. 4 |

FIG. 6

| PoE LINE STATE | | | DEVICE OPERATING STATE (EXAMPLE OF DEGRADED OPERATION) | | | | | | | | | | | REMARKS |
|---|---|---|---|---|---|---|---|---|---|---|---|---|---|---|
| PoE LINE #0 | PoE LINE #1 | PoE LINE #2 | CONSUMABLE POWER [W] | RF TRANSMISSION POWER | | | NUMBER OF CPU OPERATING CORES | | CPU OPERATING CLK | | | NUMBER OF ANTENNAS IN OPERATION | | FUNCTIONAL BLOCK | | |
| | | | | 10 mW | 50 mW | 100 mW | Single | Dual | 600 M | 800 M | 1 G | 1 | 2 | Wifi | HDD | |
| NORMAL | NORMAL | NORMAL | 76.5 W | | | ● | | ● | | | ● | | ● | ● | ● | NORMAL OPERATION |
| NORMAL | NORMAL | ABNORMAL | 51 W | | | ● | ● | | | ● | | ● | | ● | | |
| NORMAL | ABNORMAL | NORMAL | 51 W | | | | | | | | | | | ● | | |
| ABNORMAL | NORMAL | NORMAL | | | | | ● | | ● | | | ● | | | | |
| NORMAL | ABNORMAL | ABNORMAL | 25.5 W | ● | | | | | | | | | | | | |
| ABNORMAL | NORMAL | ABNORMAL | 25.5 W | | | | | | | | | | | | | |
| ABNORMAL | ABNORMAL | NORMAL | | | | | | | | | | | | | | |
| ABNORMAL | ABNORMAL | ABNORMAL | 0 W | × | × | × | × | × | × | × | × | × | × | × | × | UNABLE TO OPERATE DEVICE |

FIG. 7

| NUMBER OF CONNECTED UEs | NUMBER OF CPU OPERATING CORES | CPU OPERATING CLK SPEED |
|---|---|---|
| 20 OR MORE | DUAL | 1 G |
| 10 TO 19 | DUAL | 800 M |
| LESS THAN OR EQUAL TO 9 | SINGLE | 600 M |

FIG. 8

| MAXIMUM PATH LOSS OF CONNECTED UEs | RF TRANSMISSION POWER |
|---|---|
| LARGE (120 dBm OR MORE) | 100 mW |
| MIDDLE (110 TO 119 dBm) | 50 mw |
| SMALL (LESS THAN OR EQUAL TO 109 dBm) | 10 mW |

FIG. 9A

| PoE Line State | | | Consumable Power [W] | Number of Connected UEs | Path Loss | Device Operating State (Example of Degraded Operation) | | | | | | | | | | Remarks |
|---|---|---|---|---|---|---|---|---|---|---|---|---|---|---|---|---|
| PoE Line #0 | PoE Line #1 | PoE Line #2 | | | | RF Transmission Power | | | Number of CPU Operating Cores | | CPU Operating CLK | | | Number of Antennas in Operation | | Functional Block | |
| | | | | | | 10 mW | 50 mW | 100 mW | Single | Dual | 600 M | 800 M | 1 G | 1 | 2 | WiFi | HDD | |
| Normal | Normal | Normal | 76.5 W | — | — | | | ● | | ● | | | ● | | ● | ● | ● | Normal operation |
| Normal | Normal | Abnormal | 51 W | 20 or more | 120 dBm or more | | | ● | | ● | | | ● | ● | | | | Select the number of antennas in operation, and the functional blocks from operable combination within consumable power (surplus power) |
| Normal | Normal | Abnormal | 51 W | 20 or more | 110 to 119 dBm | | ● | | | ● | | | ● | | ● | | | |
| Normal | Normal | Abnormal | 51 W | 20 or more | Less than or equal to 109 dBm | ● | | | | ● | | | ● | | ● | | | |
| Normal | Abnormal | Normal | 51 W | 10 to 19 | 120 dBm or more | | | ● | | ● | | ● | | ● | | | ● | |
| Normal | Abnormal | Normal | 51 W | 10 to 19 | 110 to 119 dBm | | ● | | | ● | | ● | | | ● | ● | ● | |
| Normal | Abnormal | Normal | 51 W | 10 to 19 | Less than or equal to 109 dBm | ● | | | | ● | | ● | | | ● | ● | ● | |
| Abnormal | Normal | Normal | 51 W | Less than 10 | 120 dBm or more | | | ● | ● | | ● | | | ● | | ● | ● | |
| Abnormal | Normal | Normal | 51 W | Less than 10 | 110 to 119 dBm | | ● | | ● | | ● | | | | ● | ● | ● | |
| Abnormal | Normal | Normal | 51 W | Less than 10 | Less than or equal to 109 dBm | ● | | | ● | | ● | | | | ● | ● | ● | |

FIG. 9B

| PoE LINE STATE | | | CONSUMABLE POWER [W] | NUMBER OF CONNECTED UEs | PATH LOSS | DEVICE OPERATING STATE (EXAMPLE OF DEGRADED OPERATION) | | | | | | | | | | REMARKS |
|---|---|---|---|---|---|---|---|---|---|---|---|---|---|---|---|---|
| PoE LINE #0 | PoE LINE #1 | PoE LINE #2 | | | | RF TRANSMISSION POWER | | | NUMBER OF CPU OPERATING CORES | | CPU OPERATING CLK | | | NUMBER OF ANTENNAS IN OPERATION | FUNCTIONAL BLOCK | |
| | | | | | | 10 mW | 50 mW | 100 mW | Single | Dual | 600 M | 800 M | 1 G | 1 | 2 | WiFi | HDD | |
| NORMAL | ABNORMAL | ABNORMAL | | 20 OR MORE | 120 dBm OR MORE | ● | | | ● | | ● | | | ● | | | | CONSUMABLE POWER IS LOW, AND THUS OPERATION IS UNIFORMLY PERFORMED WITH MINIMUM CONFIGURATION |
| | | | | | 110 TO 119 dBm | ● | | | ● | | ● | | | ● | | | | |
| | | | | | LESS THAN OR EQUAL TO 109 dBm | ● | | | ● | | ● | | | ● | | | | |
| ABNORMAL | NORMAL | ABNORMAL | 25.5 W | 10 TO 19 | 120 dBm OR MORE | ● | | | ● | | ● | | | ● | | | | |
| | | | | | 110 TO 119 dBm | ● | | | ● | | ● | | | ● | | | | |
| | | | | | LESS THAN OR EQUAL TO 109 dBm | ● | | | ● | | ● | | | ● | | | | |
| ABNORMAL | ABNORMAL | NORMAL | | LESS THAN 10 | 120 dBm OR MORE | ● | | | ● | | ● | | | ● | | | | |
| | | | | | 110 TO 119 dBm | ● | | | ● | | ● | | | ● | | | | |
| | | | | | LESS THAN OR EQUAL TO 109 dBm | ● | | | ● | | ● | | | ● | | | | |
| ABNORMAL | ABNORMAL | ABNORMAL | 0 W | — | — | × | × | × | × | × | × | × | × | × | × | × | × | UNABLE TO OPERATE DEVICE |

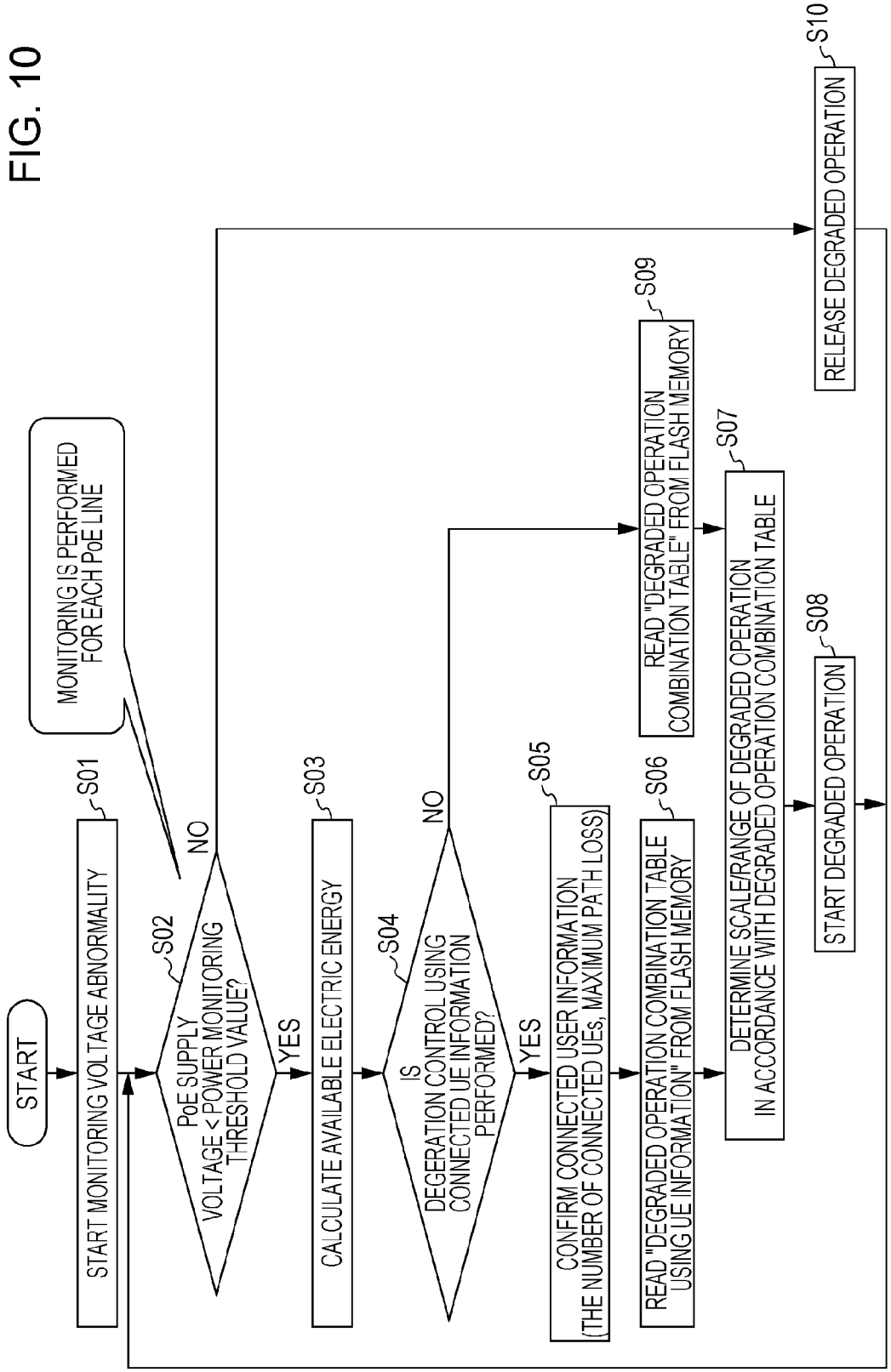

COMMUNICATION APPARATUS

CROSS-REFERENCE TO RELATED APPLICATION

This application is based upon and claims the benefit of priority of the prior Japanese Patent Application No. 2014-254057, filed on Dec. 16, 2014, the entire contents of which are incorporated herein by reference.

FIELD

The embodiments discussed herein are related to a communication apparatus.

BACKGROUND

As one of methods for supplying power to a communication apparatus, Power over Ethernet (registered trademark) (PoE) is provided. PoE is technology for supplying power using an Ethernet communication cable (hereinafter referred to as a local area network (LAN) cable). As standards regarding the PoE technology, IEEE802.3af and IEEE802.3at are provided.

As one of the communication apparatuses (electronic devices) to which the PoE technology is applied, a base station apparatus called a femto base station is provided. A LAN cable (referred to as a PoE line) is connected to the femto base station, and power supplied from the PoE line is supplied to each unit in the femto base station, and various functions as a base station are performed.

Related-art techniques are disclosed in Japanese Laid-open Patent Publication No. 2010-63000, and Japanese National Publication of International Patent Application No. 2012-518820.

SUMMARY

According to an aspect of the invention, a communication apparatus is configured to work by power supplied through a communication line, the communication apparatus includes: a controller, when the controller detects that the power supplied through the communication line decreases in a predetermined range, configured to degrade operation of the communication apparatus, the degraded operation including at least one of stop of partial function among functions held by the communication apparatus and a decrease in performance of the functions held by the communication apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram schematically illustrating functions of the femto base station illustrated in FIG. 1;

FIG. 3 is a graph illustrating a relationship between abnormality of PoE line and voltage;

FIG. 4 illustrates a calculation expression of requisite capacitance of a capacitor, and a table illustrating an example of calculation of the requisite capacitance;

FIG. 5 is a tables illustrating example patterns of receiving possible power of a femto base station in accordance with a PoE line class and a PoE line state;

FIG. 6 illustrates an example of a data structure of a degraded operation combination table;

FIG. 7 is a diagram illustrating a relationship between the number of connected UEs indicating the number of wireless terminals connected to a femto base station, and the operation state of a CPU;

FIG. 8 is a diagram illustrating a relationship between the maximum path loss of the wireless terminals connected to a femto base station, and transmission power;

FIG. 9A and FIG. 9B illustrate an example of a data structure of a degraded operation combination table; and FIG. 10 is a flowchart illustrating an example of processing by a processor.

DESCRIPTION OF EMBODIMENTS

Figure 1:
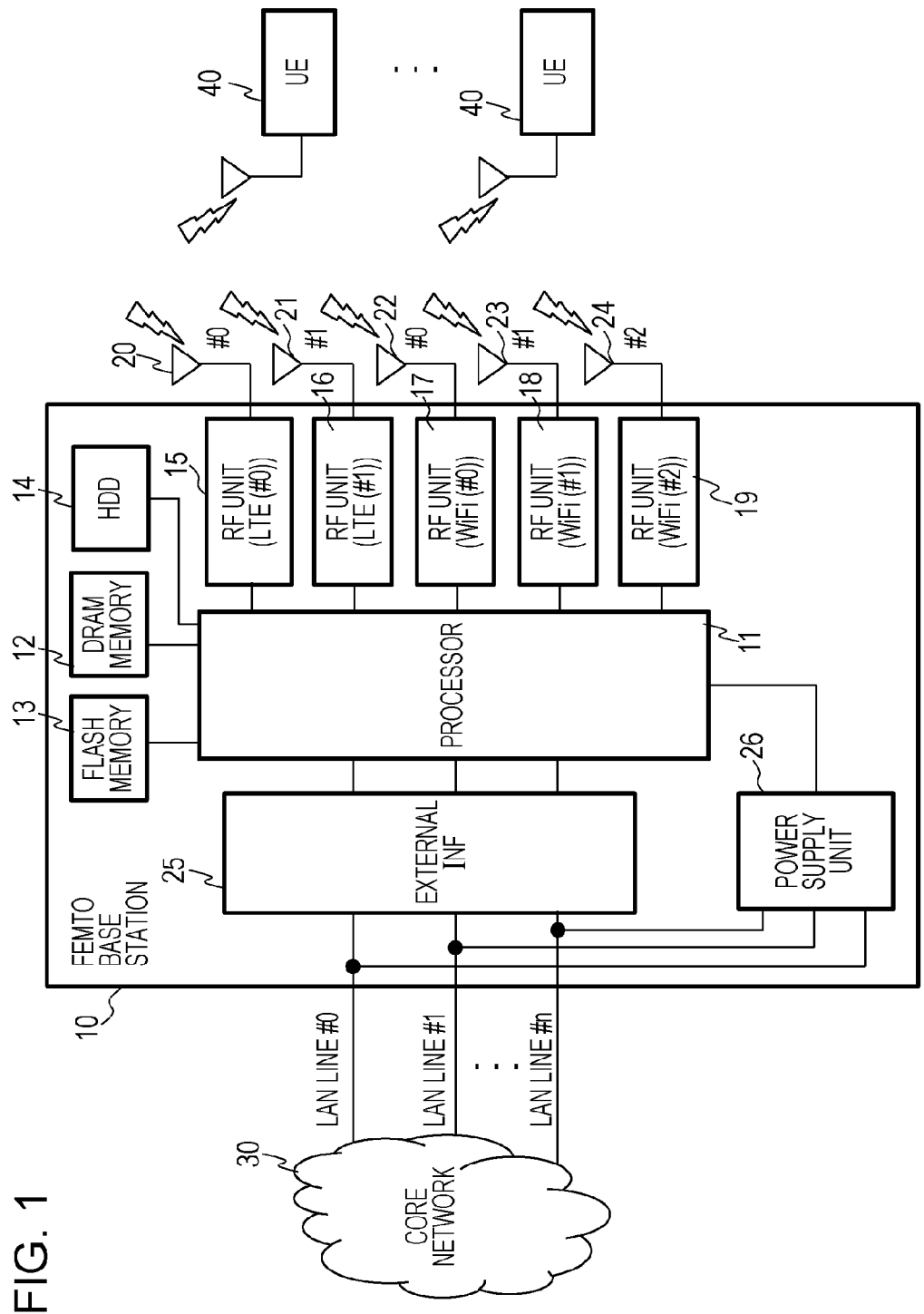
FIG. 1 illustrates an example of a hardware configuration of a femto base station.

With the trend toward higher functionality of femto base stations in recent years, there are cases where power supplied by one PoE line is insufficient. In these cases, power is supplied to a femto base station through a plurality of PoE lines.

However, when a femto base station goes into a state in which power is not supplied from at least one of a plurality of PoE lines because of a line failure, a device failure of an upstream side, or the like, the entire femto base station sometimes becomes an operation stop state.

In the following, a description will be given of embodiments of a communication apparatus capable of continuing operation even if power supplied from communication lines is reduced with reference to the drawings. The configurations in the embodiments are examples, and the present disclosure is not limited to the configurations of the embodiments.

In the embodiments described below, a description will be given of a communication apparatus which is operated by power supplied from communication lines, and in which degraded operation is started when a drop in power supplied from communication lines in a predetermined range is detected.

The "communication apparatus" includes a base station apparatus, and an electronic device having a communication function other than the function of a base station apparatus. The "base station apparatus" is a wireless base station of a mobile phone, for example. It does not matter if the wireless base station conforms to any kind of wireless communication standards (wireless communication methods). As a wireless communication standard, the second to the fourth generation wireless communication standards may be given. For example, Global System for Mobile communications (GSM (registered trademark)), Wideband Code Division Multiple Access (W-CDMA (may also be called Universal Mobile Telecommunications System (UMTS))), CDMA2000, Long Term Evolution (LTE), and LTE-Advanced. However, the wireless communication standard is not limited to these.

Also, the "base station apparatus" is not limited by the size of cells formed by the base station. The "base station" includes, for example, a femto base station, a pico cell base station, a small cell base station, and the other base stations. Also, the "base station apparatus" includes wireless access point apparatuses conforming not only to the wireless communication standards of mobile phones, but also to the other wireless communication standards, such as Wi-Fi, a wireless LAN (IEEE802.11 series), Bluetooth (registered trademark). In the embodiments, a description will be given of an example in which a femto base station is applied as the "communication apparatus".

Configuration of Femto Base Station

FIG. 1 illustrates an example of a hardware configuration of a femto base station. In FIG. 1, a femto base station 10 includes a processor 11, and a dynamic random access memory (DRAM) 12, a flash memory 13, and a hard disk drive (HDD) 14, which are individually connected to the processor 11.

Also, the femto base station 10 includes a radio frequency (RF) unit 15 (LTE (#0)) and an RF unit 16 (LTE (#1)) for LTE, and an RF unit 17 (Wi-Fi (#0)), an RF unit 18 (Wi-Fi (#1)), and an RF unit 19 (Wi-Fi (#2)) for Wi-Fi. The RF units 15 to 19 are individually connected to the processor. The LTE technology is an example of a "first wireless communication method", and the Wi-Fi technology is an example of a "second wireless communication method".

The RF unit 15 is connected to a transmission and reception antenna 20, and the RF unit 16 is connected to a transmission and reception antenna 21. The RF unit 17 is connected to a transmission and reception antenna 22, the RF unit 18 is connected to a transmission and reception antenna 23, and the RF unit 19 is connected to a transmission and reception antenna 24.

In this manner, the femto base station 10 performs wireless communication with wireless terminals (user equipment (UE)) 40 using the two different wireless communication standards, namely LTE and Wi-Fi. The wireless terminal 40 supports at least one of LTE and Wi-Fi. The wireless terminal 40 is an example of a "terminal".

Further, the femto base station 10 includes an external interface (external INF) 25, and a power supply unit 26. The external INF 25 is an interface circuit that accommodates a plurality of LAN lines (LAN lines #0 to #n (n is an integer of 1 or more)), and is connected to a core network 30 through the LAN lines #0 to #n. The LAN lines #0 to #n are examples of the "PoE lines" and the "communication lines".

The external INF 25 controls transmission and reception processing of packets with the core network 30. For the external INF 25, it is possible to apply a LAN card, or a network interface card (NIC), for example.

A power supply unit 26 receives power supplied from the LAN lines #0 to #n, and supplies operation power to power supply destinations in the femto base station 10 through the power supply lines not illustrated in FIG. 1. The supply destinations include the processor 11, the DRAM memory 12, the flash memory 13, the HDD 14, the RF units 15 to 19, and the transmission and reception antennas 20 to 24. Also, the power supply destination may be a peripheral device connected to the femto base station 10 through an interface not illustrated in the FIG. 1. Also, the power supply unit 26 monitors power supply states from each of the LAN lines #0 to #n.

Each of the RF units 15 to 19 is formed by a circuit group handling a radio signal (RF signal). For example, each of the RF units 15 to 19 includes a DA converter, an up-converter, a power amplifier, and a duplexer as a downlink circuit group. The DA converter converts a digital baseband signal supplied from the processor into an analog signal. The up-converter up-converts the analog signal into a radio frequency (RF) signal (radio signal). The power amplifier amplifies the radio signal. The duplexer connects the amplified radio signal to the transmission and reception antennas.

Each of the transmission and reception antennas 20 to 24 transmits a radio signal. Also, each of the RF units 15 to 19 includes a low noise amplifier, a down-converter, and an AD converter as an uplink circuit group. A radio signal received by each of the transmission and reception antennas 20 to 24 is connected to the low noise amplifier through the duplexer. The low noise amplifier amplifies the radio signal with low noise. The down-converter down-converts the radio signal amplified with low noise into an analog signal. The AD converter converts the analog signal into a digital baseband signal, and sends the digital baseband signal to the processor 11.

The DRAM 12 is used as a working area (main storage device: main memory) of the processor. The flash memory 13 and the HDD 14 individually store programs executed by the processor, and data used at the time of program execution.

The DRAM 12 is an example of a random access memory (RAM), and may be a static RAM (SRAM). Also, the RAM is an example of a volatile storage medium (volatile memory). The flash memory 13 and the HDD 14 are individual examples of auxiliary storage devices. The auxiliary storage device may be a nonvolatile storage medium (nonvolatile memory) other than the flash memory 13 and the HDD 14. The nonvolatile storage medium includes a read only memory (ROM), an electrically erasable programmable read-only memory (EEPROM), a solid state drive (SSD), and the like. In this regard, although FIG. 1 illustrates an example including the flash memory 13 and the HDD 14, both the flash memory 13 and the HDD 14 do not have to be included, and either one of the flash memory 13 and the HDD 14 may be omitted. The above-described volatile storage medium and nonvolatile storage medium are individual examples of a "computer readable storage medium", a "storage device", and a "memory".

The processor 11 is, for example, a central processing unit (CPU), a digital signal processor (DSP), or a combination of these. The processor 11 loads a program stored at least one of the flash memory 13 and the HDD 14 into the DRAM 12, and executes the program in order to perform various processing.

For example, the processor 11 performs baseband processing. The baseband processing includes processing for coding packets (data) from the external INF 25, and performs digital conversion into a digital baseband signal, and sending the signal to any corresponding one of the RF units 15 to 19. Also, the baseband processing includes processing for performing demodulation and decoding on the digital baseband signal from each of the RF units 15 to 19 to obtain data. Also, the processor 11 performs processing for generating a packet including data, and sending the packet to the external INF 25. Also, the processor 11 performs call processing of the wireless terminal 40, and maintenance, management, and monitoring (OAM) processing.

Further, when the processor 11 detects a drop in power supplied from the LAN lines #0 to #n (PoE cables) in a predetermined range, which is caused by an interrupt notification from the power supply unit 26, the processor 11 starts degraded operation of the femto base station 10. To put it in another way, when the power supplied from the LAN lines #0 to #n is in a normal range, the femto base station 10 operates in a normal mode, and when the power drops in a predetermined range lower than the normal range, the femto base station 10 operates in a degraded operation mode.

In this regard, the processor 11 may be a CPU, a DSP, and a combination of these, or a combination of these with an integrated circuit (IC). The integrated circuit includes at least one of an IC, a large scale integration (LSI), an application specific integrated circuit (ASIC), and a programmable logic device (PLD). The PLD includes a field programmable gate array (FPGA), for example. Also, the processing performed by the processor 11 may be performed by a hardware logic formed by one integrated circuit or more. To put it in another way, the processor 11 may be a device that performs software processing using a general-purpose processor, such as a CPU and a DSP, and may be a device formed by a dedicated hardware circuit. The processor 11 is an example of a "control circuit", or a "controller".

FIG. 2 is a diagram schematically illustrating functions of the femto base station 10 illustrated in FIG. 1. In FIG. 2, PoE line #0 to PoE line #n are the LAN lines #0 to #n illustrated in FIG. 1, and are connected to the power supply unit 26. The power supply unit 26 includes the following configuration for each of the PoE line #0 to PoE line #n. To give an explanation of the PoE line #0 as an example, the PoE line #0 is connected to a DC/DC converter 261, and the voltage thereof is converted into the operating voltage of the femto base station 10. The DC/DC converter 261 is connected to a power supply circuit 264. The power supply circuit 264 is connected to a corresponding one of DC/DC converters 261 to each of the PoE lines, and supplies power to the power supply destination of the femto base station 10.

The PoE line #0 in the pre-stage of the DC/DC converter 261 is provided with a capacitor 262 for momentary disconnection protection. When momentary abnormality (momentary disconnection) occurs on the PoE line #0, the capacitor 262 avoids an abrupt drop of voltage. Also, the voltage of the PoE line #0 is monitored by a power monitoring circuit 263.

The power monitoring circuit 263 monitors the voltage supplied from a corresponding PoE line. FIG. 3 is a graph illustrating a relationship between abnormality of the PoE line and voltage. In FIG. 3, when power supply from the PoE line is normal, a certain voltage (PoE normal supply voltage) is observed. On the other hand, an assumption is given to the case where power supply from the PoE line #0 is stopped by a corresponding to PoE line (for example, abnormality of the PoE line #0 in FIG. 2: refer to FIG. 2<1>).

In this case, the voltage does not drop abruptly by the capacitor 262, and is gradually decreased (refer to FIG. 3). In this regard, the slope of the voltage drop depends on the capacitance of the capacitor 262. Unless the power supply of the PoE line #0 is recovered, the voltage further decreases lower than the lower limit value (the lower limit value at which the power supply is regarded as normal) of the PoE normal supply voltage, and decreases less than a predetermined threshold value of power monitoring. Then the power monitoring circuit 263 detects power abnormality (FIG. 2<2>), and sends an interrupt notification to the processor 11 (FIG. 2<3>) in order to start degraded operation of the femto base station 10.

In this regard, as illustrated in FIG. 3, the femto base station 10 has a device operating limit voltage, and if the voltage becomes lower than the device operating limit voltage, it is not possible for the femto base station 10 to maintain the operating state, and the femto base station 10 goes into a stop state of all the functions. Accordingly, the transition (migration) to a degraded operation is made while the voltage is within the range between the power monitoring threshold value and the device operating limit voltage.

In this regard, a time period from the detection of a voltage drop less than the voltage monitoring threshold value by the power monitoring circuit 263 to migration to the degraded operation differs slightly depending on the type of the CPU included in the processor 11, and the like. However, it is possible to perform the migration in a few ms in general. The capacitor 262 is disposed so that the power supply is not momentarily disconnected during such a mode change.

FIG. 4 is an explanatory diagram on the capacitance of the capacitor. It is possible to calculate the capacitance (Cin) of the capacitor using the following calculation expression.

$$Cin = 2 \times Win \times t / (Vin - Vout)^2$$

Note that "Win" is consumption power (for one PoE line) of the femto base station 10 before degraded operation, "t" is a migration time to degraded operation, "Vin" is a power monitoring threshold value, and "Vout" is a device operating limit voltage. FIG. 4 illustrates an example of calculation of requisite capacitance of the capacitor 262.

The processor 11 that has received the interrupt notification calculates available electric energy for the femto base station 10 based on the number of PoE lines receiving normal power supply. In the PoE standard IEEE802.3af and IEEE802.3at, the standards are classified for each suppliable power by power sourcing equipment (PSE) using one line. The receiving possible maximum power by a powered device (PD) is determined for each class. At the present time, there are five classes, namely class 0 to class 4. The receiving possible maximum power is 13.0 [W] for class 0, 3.84 [W] for class 1, 6.49 [W] for class 2, 12.95 [W], for class 3, and 25.5 [W] for class 4. Accordingly, it is possible for the processor 11 to calculate electric energy by the following configuration, for example.

That is to say, the information indicating the receiving possible power in accordance with a class of the PoE line #0 to the PoE line #n is stored in a predetermined storage area of the flash memory 13 and the HDD 14 in advance. For the receiving possible power, the receiving possible maximum power value for each class may be used, or a predetermined value lower than the maximum power value may be used.

The processor 11 manages the power supply state (normal or abnormal (failure)) from each of the PoE line #0 to the PoE line #n. In the management, for example, it is possible for the processor 11 to determine the power supply state of the PoE line that has received an interrupt notification to be abnormal, and to determine the power supply state of the PoE line that has not received an interrupt notification to be normal. Alternatively, when the processor 11 receives an interrupt notification from a certain power monitoring circuit 263, the processor 11 may inquire of the remaining power monitoring circuits 263 whether the power supply state is normal or abnormal.

When the processor 11 confirms the power supply state (normal or abnormal) of each of the PoE line #0 to the PoE line #n, the processor 11 calculates the total value of the receiving possible power from the normal PoE lines using information of the receiving possible power of each PoE line as the receiving possible power in the femto base station 10, and stores the total value in the DRAM 12.

The processor 11 reads the degraded operation combination table (the details will be described later) stored in the flash memory 13 into the DRAM 12 (FIG. 2<4>). Next, the processor 11 determines the operation contents in the degraded operation mode, that is to say, the contents of the degraded operation (FIG. 2<5>) based on the receiving possible power and the combination table.

In the example illustrated in FIG. 2, an antenna 51, an antenna 52, a functional unit (functional block) 53, and a functional unit (functional block) 54 are illustrated as an example. The antenna 51 is the LTE RF unit 15, and the transmission and reception antenna 20 illustrated in FIG. 1. The antenna 52 is the LTE RF unit 16, and the transmission and reception antenna 21 illustrated in FIG. 1. The functional unit 53 (functional unit #0) is the Wi-Fi RF unit 17 to RF unit 19, and the transmission and reception antennas 22 to transmission and reception antenna 24 illustrated in FIG. 1. The functional unit 54 (functional unit #n) is the HDD 14 illustrated in FIG. 1.

The processor 11 determines to stop, for example, the antenna 52 (the RF unit 16 and the transmission and reception antenna 21), and the functional unit 54 (HDD 14) as the degraded operation contents in the degraded operation mode, and starts the degraded operation (operation in the degraded operation mode) (refer to FIG. 2<6>). That is to say, the processor 11 supplies a control signal to the power supply circuit 264, for example, and stops power supply from the power supply circuit 264 to the antenna 52 and the functional unit 54. Alternatively, the processor 11 goes into a state not using (not operating) the antenna 52 and the functional unit 54.

With such degraded operation, that is to say, with power supply stop or nonuse of the antenna 52 and the functional unit 54, the consumption power of the femto base station 10 is reduced, and the consumption electric energy in the femto base station 10 falls within the receiving possible power range. Accordingly, even if the power supplied from the PoE lines is reduced, it is possible for the femto base station 10 to continue (maintain) the operating state of the femto base station 10.

Receiving Possible Power

Next, a description will be given of the receiving possible power of the femto base station 10. FIG. 5 is a tables illustrating example patterns of receiving possible power of a femto base station in accordance with a PoE line class and a PoE line state. In FIG. 5, it is assumed that there are three PoE lines (n=2), namely, PoE line #0, PoE line #1, and PoE line #2 as an example. Further, FIG. 5 illustrates an example in which there are five different patterns of the receiving possible power of the femto base station 10.

The first pattern (NO. 1) illustrates the case where all of the PoE line #0, the PoE line #1, and the PoE line #2 are class 4 (receiving possible power: 25.5 [W]), and each of the PoE lines is normal. In this case, the total value 76.5 [W] of the receiving possible power becomes the receiving possible power of the femto base station 10.

The second pattern (NO. 2) illustrates the case where the PoE line #0 and the PoE line #1 are class 4 (receiving possible power: 25.5 [W]), and the PoE line #2 is class 0 (receiving possible power: 13 [W]), and each of the PoE lines is normal. In this case, the total value 64 [W] of the receiving possible power becomes the receiving possible power of the femto base station 10.

The third pattern (NO. 3) illustrates the case where the PoE line #0 and the PoE line #2 are class 4 (receiving possible power: 25.5 [W]), and the PoE line #1 is abnormal (failure). In this case, the total value 51 [W] of the receiving possible power becomes the receiving possible power of the femto base station 10.

The fourth pattern (NO. 4) illustrates the case where the PoE line #0 is class 4 (receiving possible power: 25.5 [W]) and is normal, and the PoE line #1 is abnormal (failure), and the PoE line #2 is class 0 (receiving possible power: 13 [W]). In this case, the total value 38.5 [W] of the receiving possible power becomes the receiving possible power of the femto base station 10.

The fifth pattern (NO. 5) illustrates the case where the PoE line #0 and the PoE line #2 are class 0 (receiving possible power: 13 [W]) and are normal, and the PoE line #1 is abnormal (failure). In this case, the total value 26 [W] of the receiving possible power becomes the receiving possible power of the femto base station 10.

It is possible to handle the above-described receiving possible power as power allowed to be consumed by the femto base station 10, that is to say, consumable power.

Functional Degraded Operation (Functional Restriction)

Next, a description will be given of functional degraded operation in the degraded operation mode. The "functional degraded operation" is maintaining the operating state (operation) of the femto base station 10 by at least one of a partial stop of the functions held by the femto base station 10 (communication apparatus), and a decrease in the performance of the functions. The "degraded operation" is also referred to as "degraded running". However, it is difficult to strictly distinguish the partial functional stop and the functional performance decrease. The "functional degraded operation" is performed by stopping power supply or reduction of power supply quantity to a component or a part that fulfills its function, or by not using the component or the part that fulfills its function. Also, the "functional degraded operation" may be performed such that the contents of the degraded operation is determined so that the consumption power at the time of degraded operation falls within the range of the receiving possible power (consumable power) in consideration of the receiving possible power (consumable power) of the femto base station 10.

For the functional degraded operation, it is possible to give examples (a) to (d) as follows. Note that the following are examples, and the functional degraded operation is not limited to these.

(a) Decrease in Wireless Transmission Power

The wireless transmission power (hereinafter also referred to as "transmission power") for transmitting a radio signal from the antenna is decreased. For example, when the transmission power at normal time is 100 [mW], the transmission power is set to a lower value than 100 [mV] in the degraded operation. For example, the wireless transmission power is decreased to 50 [mW]. A plurality of values may be provided in accordance with the receiving possible power for the transmission power value at the time of the degraded operation. For example, consider the case where there are three PoE lines in the same class, and the transmission power is 100 [mV] when all the PoE lines are normal. If the number of PoE lines having abnormal power supply is one, the transmission power is set to 50 [mW]. If the number of PoE lines having abnormal power supply is two, the transmission power is set to 10 [mW]. It is possible to reduce consumption power by a decrease in transmission power.

(b) Reduction of the Number of Operating Antennas

The femto base station 10, for example, performs communication related to LTE with the wireless terminal 40 by multiple input multiple output (MIMO) using a plurality of transmission antennas. In this case, the femto base station 10 performs communication with the wireless terminal 40 by single input and single output (SISO) in the degraded operation. For example, it is assumed that MIMO communication is performed using the RF unit 15, the transmission and reception antenna 20, the RF unit 16, and the transmission and reception antenna 21 illustrated in FIG. 1. In this case, in the degraded operation, use of or power supply to one of the RF unit 15 and the transmission and reception antenna 20, and the RF unit 16 and the transmission and reception antenna 21 is stopped, and communication is performed by SISO. It is possible to reduce consumption power by stopping the use of or the power supply to the RF unit and the antenna.

Note that when a plurality of antennas are used, performing the MIMO communication is not a requisite. Also, in the above-described example, the reduction of the number of operating antennas in the communication related to LTE is described. However, the number of Wi-Fi antennas may be reduced.

(c) Reduction of Maximum Number of Simultaneous Connected Users

In the degraded operation, the number (maximum number of simultaneous connected users) of wireless terminals 40 capable of connecting to the femto base station 10 in parallel is reduced to less than the number of wireless terminals 40 at normal time. The maximum number of simultaneous connected users is reduced in order to perform the following operation. For example, the operating clock of the CPU included in the processor 11 is lowered. For example, it is possible to change the operation mode of the CPU into a low consumption power mode, or the like so as to lower the operating clock less than the operating clock in the normal mode. Alternatively, when the CPU included in the processor 11 has a multi-core configuration, operation is performed using two cores or more (for example, two cores) at normal time, whereas the number of cores used for operation is reduced in the degraded operation (for example, the number of cores is reduced to one). Lowering the operating clock and reducing the operation the number of cores makes it possible to reduce the consumption power.

(d) Stop of Functional Unit (Functional Block)

It is possible to regard the femto base station 10 as a set of a plurality of functional units (functional blocks). All the functional units are used at normal time, whereas in degraded operation, a function having a low priority is stopped among the plurality of functional units. For example, the femto base station 10 illustrated in FIG. 1 has the function as a Wi-Fi base station (access point) in addition to the function as an LTE base station (eNB). Also, the femto base station 10 includes the HDD 14 as an auxiliary storage device in addition to the flash memory 13.

In this case, for example, the priority of LTE is set higher than that of Wi-Fi, and the priority of the flash memory 13 is set higher than that of the HDD 14. Thereby, LTE and Wi-Fi, and the flash memory 13 and the HDD 14 are used at normal time, whereas at least one of Wi-Fi and HDD 14 is stopped in the degraded operation. By such stopping of the Wi-Fi RF unit and the antenna, and the HDD 14 (power supply stop, or nonuse), it is possible to reduce the consumption power. However, the type of the functional unit to be stopped is not limited to Wi-Fi and the HDD. For example, it is also possible to stop LTE and the flash memory 13.

In the degraded operation mode, it is possible to reduce the consumption power of the femto base station 10 by the degraded operation as described in the above (a) to (d), for example. Thereby, it is possible to continue operation in the range of the receiving possible power of the femto base station 10, that is to say, in the range of the consumable power of the femto base station 10.

For example, it is possible to store the type of degraded operation as described in the above (a) to (d), and the information indicating the consumption power reduction quantity corresponding to each degraded operation in the nonvolatile memory (flash memory 13) in advance. Then the processor 11 selects the type of the degraded operation so as to increase the consumption power reduction quantity larger than the insufficient electric energy obtained from the receiving possible power. In this manner, it is possible to dynamically evaluate and determine the contents (size and combination) of the degraded operation to be performed in the degraded operation mode.

Degraded Operation Combination Table

Also, it is possible to store the degraded operation combination table in which the consumable power in accordance with the state (normal or abnormal) of each PoE line, and information indicating the contents (size and combination) of the degraded operation corresponding to the consumable power is stored into the nonvolatile memory (the flash memory 13 illustrated in FIG. 1) in advance. Thereby, it is possible to omit the calculation of the insufficient electric energy, and the storage of the consumption power reduction quantity as described above.

FIG. 6 illustrates an example of a data structure of a degraded operation combination table. In FIG. 6, the combination table stores combinations of statuses (states) for the PoE line #0 to the PoE line #2 (example of n=2), and consumable power [W] for each of the combinations. The consumable power is the receiving possible power of the above-described femto base station 10.

Further, the combination table stores information indicating an operation state in accordance with the consumable power for each function of the degraded operation target in the femto base station 10 as the device operation state. In the example illustrated in FIG. 5, RF transmission power (wireless transmission power), the number of CPU operating cores, a CPU operating clock speed, the number of operating antennas, and a functional block (Wi-Fi and HDD) are illustrated as the target functions of the degraded operation.

The RF transmission power corresponds to the functional restriction (degraded operation) described in the above (a). In the example in FIG. 5, transmission power values of 100 [mV], 50 [mV], and 10 [mV] are provided. Then when the consumable power is 76.5 [W] (normal mode) and 51 [W], the transmission power is set to 100 [mV]. On the other hand, when the consumable power is 25.5 [W], the transmission power is set to 10 [mV].

For the number of CPU operating cores, "single (1)" and "dual (2)" are provided as examples. Then when the consumable power is 76.5 [W] (normal mode), the CPU operates by "dual", whereas when the consumable power is 51 [W] and 25.5 [W], the CPU operates by "single".

For the CPU operating clock, 600 MHz, 800 MHz, and 1 GHz are provided as examples. Then when the consumable power is 76.5 [W] (normal mode), the operating clock is set to 1 GHz. On the other hand, when the consumable power is 51 [W], the operating clock becomes 800 MHz, and when the consumable power is 25.5 [W], the operating clock becomes 600 MHz.

For the number of LTE operating antennas, one and two are provided as examples. Then when the consumable power is 76.5 [W] (normal mode), operation is performed using two operating antennas, whereas when the consumable power is 51 [W] and 25.5 [W], operation is performed using one operating antenna.

For the functional unit, as illustrated in the example in FIG. 2, Wi-Fi and HDD 14 are targeted. Then when the consumable power is 76.5 [W] (normal mode), both Wi-Fi and HDD 14 are in the operating state. On the other hand, when the consumable power is 51 [W], operation of HDD 14 is stopped, and when the consumable power is 25.5 [W], operation of both Wi-Fi and HDD 14 is stopped.

As the combination table illustrated for example in FIG. 5, it is possible to know the consumable power of the femto base station 10 in accordance with the state of each PoE line in detail using the receiving possible power based on the PoE class, and thus to subdivide the contents of the functional restriction (degraded operation).

It is possible for the processor 11 to read the contents (size and combination) of the degraded operation corresponding to the consumable power obtained based on the state of each PoE line from the combination table using the combination table, and to determine the contents of the degraded operation.

Consideration of Connected UE Information

By further capturing information (referred to as "connected UE information") related to the wireless terminals (UE) 40 connected (while accessing) with the femto base station 10 into the combination table as a parameter, it becomes possible to control detailed degraded operation. For example, it becomes possible to perform control so as to select a combination of degraded operation that allows keeping the connection states of the connected wireless terminals 40 as much as possible. In the following, a description will be given of an example of the connected UE information recognizable by the femto base station 10, and a control examples (A) to (C) of degraded operation.

(A) When the Number of Users (Wireless Terminals 40) Connected to the Femto Base Station 10 is Large In this case, as degraded operation, for example, the number of antennas is reduced, and a functional unit (functional block) that does not affect the communication in use is stopped with priority. That is to say, priority is given to maintaining connection with the wireless terminals 40.

(B) When the Number of Users (Wireless Terminals 40) Connected to the Femto Base Station 10 is Small In this case, for example, degraded operation is performed so as to decrease the processing speed of the CPU with priority. To put it in another way, operation is carried out so as to maintain radio quality while keeping the connection states of the users (wireless terminals 40).

FIG. 7 is a diagram illustrating a relationship between the number of connected UEs indicating the number of wireless terminals connected to the femto base station, and the operation state of the CPU. FIG. 7 illustrates degraded examples of the CPU processing speed based on the number of UEs. In the example illustrated in FIG. 7, relationships between the number of CPU operating cores and the CPU operating clock when the number of connected UEs is "20 or more", "10 to 19", and "less than or equal to 9".

Specifically, when the number of connected UEs is 20 or more, the CPU having the operation the number of cores of 2 (dual), and the operating clock of 1 GHz are used. When the number of connected UEs is 10 to 19, the CPU having dual cores, and the operating clock of 800 MHz are used. When the number of connected UEs is less than or equal to 9, the CPU having the operation the number of cores is one (single), and the operating clock of 600 MHz are used. By performing such operation by the CPU in accordance with the number of connected UEs, it is possible to carry out the degraded operation illustrated in the above-described (A) and (B).

(C) When the Number of Users (Wireless Terminals 40) Away from the Femto Base Station is Small In this case, degraded operation with a preferential decrease in transmission power is carried out. FIG. 8 is a diagram illustrating a relationship between the maximum path loss of the UE (wireless terminal 40) connected to the femto base station 10, and transmission power.

Here, the path loss is an RF (radio) propagation loss. The path loss is the difference between the transmission power of the femto base station 10, and the reception power of the radio wave from the wireless terminal 40 (UE). Normally, the path loss becomes larger as the wireless terminal 40 is located farther from the femto base station 10. Accordingly, it is possible to use the path loss as a parameter indicating a distance between the femto base station 10 and the wireless terminal 40.

In the example illustrated in FIG. 7, the maximum path loss is classified into a large, a middle, and a small classes, and a transmission power value is set in accordance with each class. Specifically, when the maximum path loss is large (for example, 120 dBm or more), the transmission power is set to 100 mW. Also, when the maximum path loss is middle (for example, 110 to 119 dBm), the transmission power is set to 50 mW. Also, when the maximum path loss is small (for example, less than or equal to 109 dBm), the transmission power is set to 10 mW. In this manner, if there are no wireless terminals 40 located far from the femto base station 10, the transmission power is reduced in order to reduce consumption power.

The contents of the degraded operation as (a) to (d), and (A) to (C) described above are stored in the combination table in advance so that the degraded operation is able to be performed within the consumable power range, for example. FIG. 9A and FIG. 9B illustrate an example of a data structure of a degraded operation combination table. FIG. 9A and FIG. 9B illustrate the example of the data structure of the combination table in which each of the degraded operation described in the above (a) to (d), and (A) to (C) is reflected. In the combination table illustrated in FIG. 9A and FIG. 9B, the contents of the degraded operation based on the connected UE information (the number of connected UEs and path loss quantity) are incorporated in the combination table illustrated in FIG. 6. In this regard, at the time of implementation, both the combination table in FIG. 6 and the combination table in FIG. 9A and FIG. 9B are implemented, for example. However, only one of the combination table in FIG. 6 and the combination table in FIG. 9A and FIG. 9B might be implemented on some occasions.

Processing Flow of Processor

FIG. 10 is a flowchart illustrating an example of processing by the processor. The processing illustrated in FIG. 10 is started when the processor 11 starts monitoring voltage abnormality of each PoE line at suitable timing (S01).

In S02, the processor 11 determines whether the voltage (PoE supply voltage) supplied from the PoE line becomes less than a power monitoring threshold value for each PoE line or not. In the processing in S02, a determination is made of whether the processor 11 has received an interrupt notification from each of the power monitoring circuits 263, for example. In S02, if there has not been an interrupt notification (all the PoE lines are normal) (No in S02), all the degraded operation is released, or a part of the degraded operation in accordance with the consumable power is released (S10). However, if the femto base station 10 operates in the normal mode at the time of S02, the normal mode (normal operation) is maintained.

On the other hand, in S02, if the supply voltage of at least one of the PoE lines becomes less than the power monitoring threshold value (Yes in S02 (detection of a PoE line failure)), the processing proceeds to S03. In S03, the processor 11 calculates available electric energy based on the receiving possible power of the remaining PoE lines.

In the next S04, the processor 11 determines whether to perform the degradation control using the connected UE information or not. If the degradation control is not performed (No in S04), the processing proceeds to S09, and the processor 11 reads the combination table illustrated in FIG. 6. After that, the processing proceeds to S07.

On the other hand, if the degradation control using the connected UE information is performed (Yes in S04), the processing proceeds to S05. In S05, the processor 11 confirms information of the connected users (wireless terminals 40). Next, the processor 11 reads the combination table illustrated in FIG. 9A and FIG. 9B from the flash memory 13.

In S07, the processor 11 determines the contents (size and range) of the degraded operation in accordance with the combination table (FIG. 9A and FIG. 9B or FIG. 6). Then processor 11 starts the operation (degraded operation) in a degraded operation mode (S08).

In this regard, in the flowchart illustrated in FIG. 10, the processing of S04 to S06 may be omitted. Alternatively, the processing in S04 and S09 may be omitted.

Advantages of Embodiments

With the femto base station 10 described above, if the power supply from the PoE lines becomes lower than a predetermined value (power monitoring threshold value) by abnormality, or the like of the PoE line receiving power supply, the processor 11 starts operation in the degraded operation mode, in which the functions of the femto base station 10 are degraded. Thereby, it is possible for the femto base station 10 to maintain the operating state, that is to say, to continue operation.

At the time of migration to the degraded operation mode, the consumable power of the femto base station 10 is calculated, and the contents (size and range) of the degraded operation is determined such that the consumption power of the femto base station 10 remains into the range of the consumable power. Thereby, it is possible to avoid power shortage in the degraded operation mode.

Also, the degraded operation combination table is stored in advance, and the consumable power is calculated from the receiving possible power of the remaining PoE lines with the exclusion of the PoE line whose power supply state is abnormal so that it is possible to easily determine the operation contents in the degraded operation mode, that is to say, the contents of the degraded operation.

Also, the contents of the degraded operation on which the connected UE information is reflected are stored in the combination table in advance so that it is possible not only to maintain the operating state of the femto base station 10, but also to protect (maintain connection) the connected wireless terminals 40 (users).

It is possible to suitably combine the configurations of the above-described embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus configured to work by power supplied through a communication line, the communication apparatus comprising:

a controller including a processor, the controller being coupled to a storage device and configured to degrade operation of the communication apparatus when the controller detects that the power supplied through the communication line decreases to a predetermined range lower than a normal range, wherein the degraded operation includes at least one selected from a group of a stop of a partial function among a plurality of functions held by the communication apparatus, and a decrease in performance of the functions held by the communication apparatus.

2. The communication apparatus according to claim 1, wherein the communication apparatus is configured to work by power supplied through a plurality of communication lines, and wherein when a decrease in power supplied through at least one of the plurality of communication lines is detected, the controller is further configured to degrade the operation of the communication apparatus.

3. The communication apparatus according to claim 2, wherein when the decrease in power supplied through at least one of the plurality of communication lines is detected, the controller is further configured to determine contents of degrading the operation such that consumption power of the communication apparatus remains within a range of power supplied through the plurality of communication lines.

4. The communication apparatus according to claim 1, wherein the controller is further configured to reduce transmission power for transmitting a radio signal from an antenna included in the communication apparatus as a function of degrading the operation.

5. The communication apparatus according to claim 1, wherein the controller is further configured to reduce a number of antennas in use included in the communication apparatus as a function of degrading the operation.

6. The communication apparatus according to claim 1, wherein the controller is further configured to reduce a number of wireless terminals allowed to connect to the communication apparatus as a function of degrading the operation.

7. The communication apparatus according to claim 1, wherein the controller is further configured to lower an operating clock frequency of a central processing unit included in the communication apparatus as a function of degrading the operation.

8. The communication apparatus according to claim 1, wherein, in a case where the communication apparatus has a multi-core configuration, the controller is further configured to reduce a number of cores in use in the multi-core configuration as a function of degrading the operation.

9. The communication apparatus according to claim 1, wherein, in a case where the communication apparatus is configured to operate in accordance with a first communication standard and in accordance with a second communication standard, the controller is further configured to stop either one of the first communication standard and the second communication standard as a function of degrading the operation.

10. The communication apparatus according to claim 9, wherein the first communication standard is Long Term Evolution (LTE) and the second communication standard is radio frequency (RF).

11. The communication apparatus according to claim 1, wherein, in a case where the communication apparatus has a plurality of auxiliary storage devices, the controller is further configured to stop at least one of the plurality of auxiliary storage devices as a function of degrading the operation.

12. The communication apparatus according to claim 1, wherein the controller is further configured to degrade the operation of the communication apparatus in accordance with information related to a wireless terminal connecting to the communication apparatus.

13. The communication apparatus according to claim 12, wherein when a number of wireless terminals connecting to the communication apparatus is in a predetermined range, the controller is further configured to lower an operating clock frequency of a central processing unit included in the communication apparatus as a function of degrading the operation.

14. The communication apparatus according to claim 12, wherein, in a case where the communication apparatus has a multi-core configuration, the controller is further configured to reduce a number of cores in use in the multi-core configuration as a function of degrading the operation when a number of wireless terminals connecting to the communication apparatus is less than a predetermined range.

15. The communication apparatus according to claim 12, wherein the controller is further configured to reduce transmission power for transmitting a radio signal from an antenna included in the communication apparatus as a function of degrading the operation in accordance with a distance between a wireless terminal connecting to the communication apparatus and the communication apparatus.

16. The communication apparatus according to claim 1, wherein:
the storage device configured to store information individually indicating consumable power of the communication apparatus in accordance with a power supply state of a plurality of communication lines through which power is supplied for the communication apparatus, and contents of a function of degrading the operation corresponding to the consumable power, and
the controller is further configured to read the contents of the function of degrading the operation corresponding to the consumable power in accordance with the power supply state of the plurality of communication lines from the storage device, and to degrade the operation of the communication apparatus based on the read contents of degrading the operation.

17. The communication apparatus according to claim 1, wherein the plurality of functions are selected from a group of one or more Long Term Evolution (LTE) transmission units and one or more radio frequency (RF) units.

* * * * *